(12) United States Patent
Choi et al.

(10) Patent No.: US 11,574,185 B2
(45) Date of Patent: Feb. 7, 2023

(54) APPARATUS AND METHOD FOR TRAINING DEEP NEURAL NETWORK

(71) Applicant: SAMSUNG SDS CO., LTD., Seoul (KR)

(72) Inventors: Jong-Won Choi, Seoul (KR); Young-Joon Choi, Seoul (KR); Ji-Hoon Kim, Seoul (KR); Byoung-Jip Kim, Seoul (KR); Seong-Won Bak, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 645 days.

(21) Appl. No.: 16/665,957

(22) Filed: Oct. 28, 2019

(65) Prior Publication Data

US 2021/0125057 A1    Apr. 29, 2021

(30) Foreign Application Priority Data

Oct. 23, 2019    (KR) .......................... 10-2019-0131873

(51) Int. Cl.
| | | |
|---|---|---|
| *G06F 9/00* | (2006.01) | |
| *G06N 3/08* | (2023.01) | |
| *G06N 5/04* | (2023.01) | |
| *G06N 20/00* | (2019.01) | |
| *G06N 3/04* | (2023.01) | |
| *G06N 7/04* | (2006.01) | |

(52) U.S. Cl.
CPC .............. *G06N 3/08* (2013.01); *G06N 3/04* (2013.01); *G06N 5/04* (2013.01); *G06N 7/046* (2013.01); *G06N 20/00* (2019.01)

(58) Field of Classification Search
CPC .. G06N 3/08; G06N 3/04; G06N 5/04; G06N 7/046; G06N 20/00; G06N 20/20; G06N 3/0454
USPC .......................................................... 706/20
See application file for complete search history.

(56) References Cited

U.S. PATENT DOCUMENTS

| | | | | |
|---|---|---|---|---|
| 11,345,234 | B2 * | 5/2022 | Kim ........................ | G08B 21/06 |
| 2016/0379352 | A1 * | 12/2016 | Zhang ................... | G06N 3/0454 |
| | | | | 382/157 |
| 2018/0358001 | A1 * | 12/2018 | Amid ................... | G06F 16/3329 |
| 2020/0130177 | A1 * | 4/2020 | Kolouri .................... | B25J 9/163 |
| 2020/0176112 | A1 * | 6/2020 | Sati ......................... | G06F 40/30 |
| 2020/0210553 | A1 * | 7/2020 | Lin ....................... | G06N 3/0454 |
| 2021/0125001 | A1 * | 4/2021 | Guo ......................... | G06F 16/55 |
| 2021/0264214 | A1 * | 8/2021 | Ozcan .................... | G06V 20/698 |
| 2021/0406644 | A1 * | 12/2021 | Salman ...................... | G06N 3/08 |

FOREIGN PATENT DOCUMENTS

KR    10-2002024 B1    7/2019

* cited by examiner

*Primary Examiner* — Volvick Derose
(74) *Attorney, Agent, or Firm* — The PL Law Group, PLLC (57) ABSTRACT

A method for training a deep neural network according to an embodiment includes training a deep neural network model using a first data set including a plurality of labeled data and a second data set including a plurality of unlabeled data, assigning a ground-truth label value to some of the plurality of unlabeled data, updating the first data set and the second data set such that the data to which the ground-truth label value is assigned is included in the first data set, and further training the deep neural network model using the updated first data set and the updated second data set.

20 Claims, 6 Drawing Sheets

APPARATUS AND METHOD FOR TRAINING DEEP NEURAL NETWORK

CROSS REFERENCE TO RELATED APPLICATIONS AND CLAIM OF PRIORITY

This application claims the benefit of Korean Patent Application No. 10-2019-0131873 filed on Oct. 23, 2019 in the Korean Intellectual Property Office, the disclosure of which is incorporated herein by reference in its entirety.

TECHNICAL FIELD

The following description relates to training technology for deep neural network.

BACKGROUND ART

Existing active sampling methodologies for training a deep neural network model only use labeled data to train a deep neural network model and thus cannot use information of unlabeled data in the training. If information of unlabeled data is desired to be used, a new deep neural network model must be retrained from the beginning through semi-supervised learning based on the whole data after the active sampling is competed. In this case, there are drawbacks in that training resources used in the active sampling process are wasted and the deep neural network model must be newly trained for a long time even after the active sampling is completed. In addition, the training effect of data selected in the active sampling process may be less correlated with the training effect of semi-supervised learning.

SUMMARY

The disclosed embodiments are intended to provide an apparatus and method for training a neural network.

In one general aspect, there is provided a method which is performed by a computing device comprising one or more processors and a memory storing one or more programs to be executed by the one or more processors, the method including training a deep neural network model using a first data set including a plurality of labeled data and a second data set including a plurality of unlabeled data; assigning a ground-truth label value to some of the plurality of unlabeled data; updating the first data set and the second data set such that the data to which the ground-truth label value is assigned is included in the first data set; and further training the deep neural network model using the updated first data set and the updated second data set.

The deep neural network model may comprises a feature extractor configured to generate a feature vector for input data of the deep neural network model and a plurality of classifiers configured to each generate an estimated label value for the input data based on the feature vector.

The training may comprise training the deep neural network by performing a first global update to update a training parameter of the deep neural network model using the first data set and a first local update to update a training parameter of each of the plurality of classifiers using the second data set.

The training may comprise repeating the first global update and the first local update alternately.

The training may comprise performing the first global update such that a ground-truth label value assigned to each data included in the first data set matches the estimated label value of each of the plurality of classifiers for each data included in the first data set; and performing the first local update such that each of the plurality of classifiers generates a different estimated label value for each data included in the second data set.

The training may comprise performing the first global update using a first loss function based on the ground-truth label value assigned to each data included in the first data set and the estimated label value of each of the plurality of classifiers for each data included in the first data set; and performing the first local update using a second loss function based on the estimated label value of each of the plurality of classifiers for each data included in the second data set and an ensemble-estimated label value based on the estimated label value of each of the plurality of classifiers for each data included in the second data set.

The assigning may comprise determining some of the data included in the first data set to be target data to be labeled based on an estimated label value of each of the plurality of classifiers for each data included in the first data set; receiving the ground-truth label value to be assigned to each target data to be labeled from a user; and assigning the received ground-truth label value to each target data to be labeled.

The determining may comprise calculating a score for each data included in the first data set such that the more the estimated label values of the plurality of classifiers differ, the higher the score of each data included in the first data set is; and determining, as the target data to be labeled, a predetermined number of data or a predetermined proportion of data, among the data included in the first data set, based on descending order of the scores calculated.

The further training may comprise further training the deep neural network model by performing second global update to update the training parameter of the deep neural network model using the updated first data set and second local update to update the training parameter of the feature extractor using the updated second data set.

The further training may comprise repeating the second global update and the second local update alternately.

The further training may comprise performing the second global update such that a ground-truth label value assigned to each data included in the updated first data set matches an estimated label value of each of the plurality of classifiers for each data included in the updated first data set; and performing the second local update such that each of the plurality of classifiers generates the same estimated label value for each data included in the updated first data set.

The further training may comprise performing the second global update using a first loss function based on a ground-truth label value assigned to each data included in the updated first data set and an estimated label value of each of the plurality of classifiers for each data included in the updated first data set; and performing the second local update using a third loss function based on an estimated label value of each of the plurality of classifiers for each data included in the updated second data set and an ensemble-estimated label value based on the estimated label value of each of the plurality of classifiers for each data included in the updated second data set.

In another general aspect, there is provided an apparatus comprising one or more processors and a memory storing one or more programs to be executed by the one or more processors, wherein the programs include commands to perform operations comprising: training a deep neural network model using a first data set including a plurality of labeled data and a second data set including a plurality of unlabeled data, assigning a ground-truth label value to some of the plurality of unlabeled data, updating the first data set and the second data set such that the data to which the ground-truth label value is assigned is included in the first data set, and further training the deep neural network model using the updated first data set and the updated second data set.

The deep neural network model may comprise a feature extractor configured to generate a feature vector for input data of the deep neural network model and a plurality of classifiers configured to each generate an estimated label value for the input data based on the feature vector.

The training may comprise training the deep neural network by performing a first global update to update a training parameter of the deep neural network model using the first data set and a first local update to update a training parameter of each of the plurality of classifiers using the second data set.

The training of the deep neural network model may comprise repeating the first global update and the first local update alternately.

The training may comprise performing the first global update such that a ground-truth label value assigned to each data included in the first data set matches the estimated label value of each of the plurality of classifiers for each data included in the first data set; and performing the first local update such that each of the plurality of classifiers generates a different estimated label value for each data included in the second data set.

The training may comprise performing the first global update using a first loss function based on the ground-truth label value assigned to each data included in the first data set and the estimated label value of each of the plurality of classifiers for each data included in the first data set; and performing the first local update using a second loss function based on the estimated label value of each of the plurality of classifiers for each data included in the second data set and an ensemble-estimated label value based on the estimated label value of each of the plurality of classifiers for each data included in the second data set.

The assigning may comprise determining some of the data included in the first data set to be target data to be labeled based on an estimated label value of each of the plurality of classifiers for each data included in the first data set; receiving the ground-truth label value to be assigned to each target data to be labeled from a user; and assigning the received ground-truth label value to each target data to be labeled.

The determining may comprise calculating a score for each data included in the first data set such that the more the estimated label values of the plurality of classifiers differ, the higher the score of each data included in the first data set is; and determining, as the target data to be labeled, a predetermined number of data or a predetermined proportion of data, among the data included in the first data set, based on descending order of the scores calculated.

The further training may comprise further training the deep neural network model by performing second global update to update the training parameter of the deep neural network model using the updated first data set and second local update to update the training parameter of the feature extractor using the updated second data set.

The further training may comprise repeating the second global update and the second local update alternately.

The further training may comprise performing the second global update such that a ground-truth label value assigned to each data included in the updated first data set matches an estimated label value of each of the plurality of classifiers for each data included in the updated first data set; and performing the second local update such that each of the plurality of classifiers generates the same estimated label value for each data included in the updated first data set.

The further training may comprise performing the second global update using a first loss function based on a ground-truth label value assigned to each data included in the updated first data set and an estimated label value of each of the plurality of classifiers for each data included in the updated first data set; and performing the second local update using a third loss function based on an estimated label value of each of the plurality of classifiers for each data included in the updated second data set and an ensemble-estimated label value based on the estimated label value of each of the plurality of classifiers for each data included in the updated second data set.

According to the embodiments of the present disclosure, training for active sampling and semi-supervised learning can be continuously performed, so that training time for a deep neural network model can be significantly reduced. Also, since continuous training based on the same deep neural network model is performed, it is possible to solve a low correlation problem of training effect that occurs in an existing methodology.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
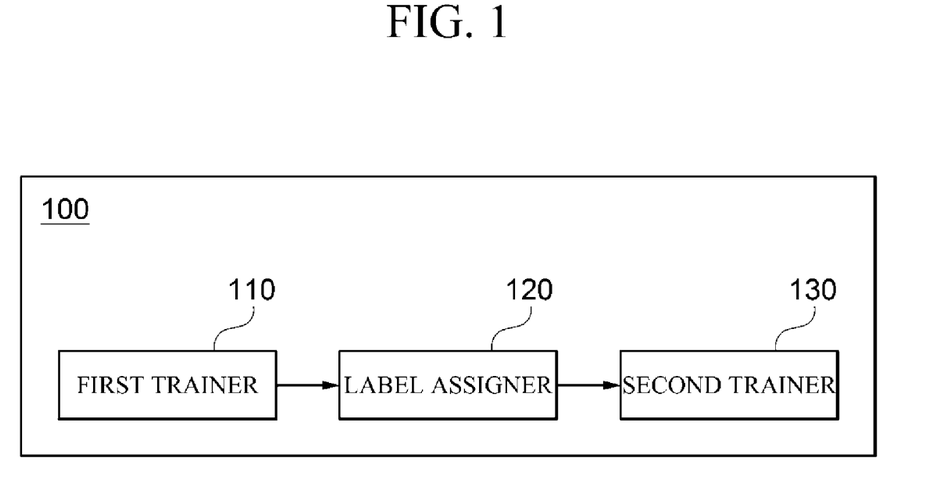
FIG. 1 is a diagram illustrating a configuration of a training apparatus according to one embodiment.

FIG. 1 is a diagram illustrating a configuration of a training apparatus according to one embodiment.

Referring to FIG. 1, the training apparatus 100 according to one embodiment includes a first trainer 110, a label assigner 130, and a second trainer 120.

The first trainer 110 trains a deep neural network model using a first data set including a plurality of labeled data and a second data set including a plurality of unlabeled data.

According to one embodiment, the deep neural network model may be a deep neural network based classification model that is trained to classify arbitrary input data into a specific class of a plurality of preset classes and to output an estimated label value corresponding to the specific class. In this case, according to one embodiment, the input data of the deep neural network model may be, for example, image data, but is not necessarily limited to a specific form of data.

Figure 2:
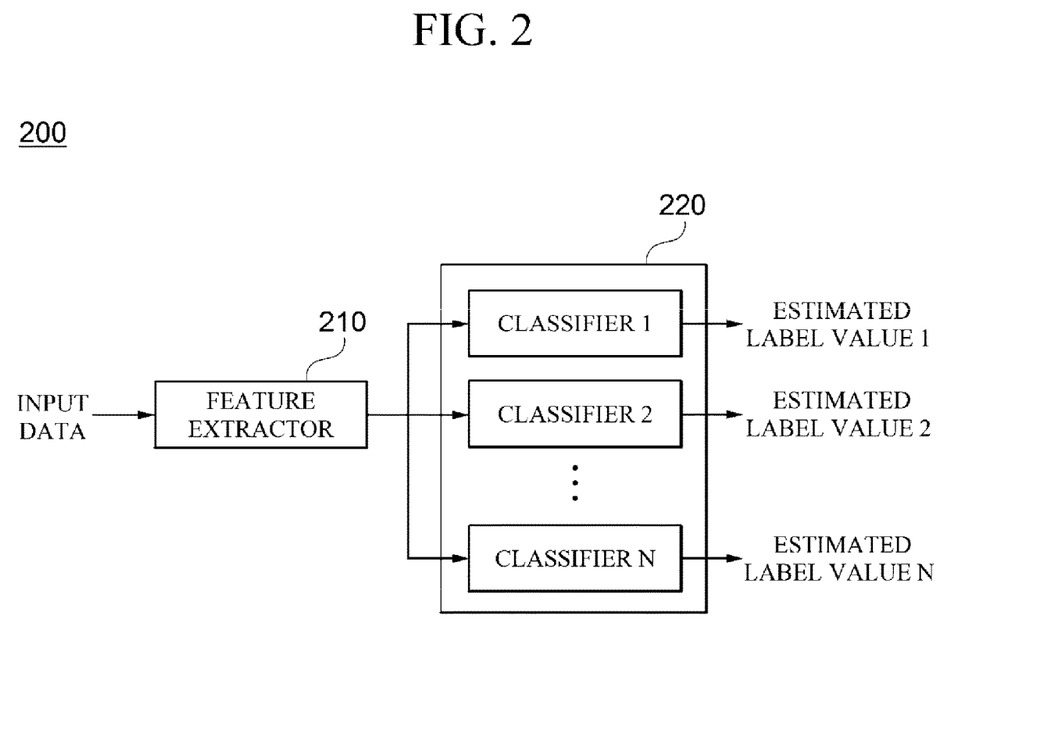
FIG. 2 is a diagram illustrating a configuration of a deep neural network model according to one embodiment.

According to one embodiment, as shown in an example of FIG. 2, the deep neural network model 200 may include a feature extractor 210 and a plurality of classifiers 220 configured to generate an estimated label value for input data input to the deep neural network model 200 based on an output of the feature extractor 210.

Specifically, according to one embodiment, the feature extractor 210 may be a neural network for generating a feature vector for the input data of the deep neural network model 200. For example, the feature extractor 210 may be a multi-layer neural network including an input layer that receives the input data of the deep neural network model 200, an output layer that outputs a feature vector for the input data, and one or more hidden layers connected between the input layer and the output layer.

Also, according to one embodiment, each of the plurality of classifier 220 may receive the feature vector output from the feature extractor 210 and generate an estimated label value for the input data.

According to one embodiment, the plurality of classifiers 220 may all have the same structure, but are not necessarily limited thereto. According to an embodiment, the plurality of classifiers 220 may all have different structures or have partially different structures.

For example, at least one of the plurality of classifiers 220 may be a single-layer neural network which uses, as an activation function, a linear or nonlinear function, such as sigmoid function, hyperbolic tangent function, rectified linear unit (ReLU) function, softmax function, or the like, which can be used for binary classification or multiclass classification.

In another example, at least one of the plurality of classifiers 220 may be a multi-layer neural network that includes an output layer which uses the aforementioned linear or nonlinear classification function as an activation function.

In still another example, at least one of the plurality of classifiers 220 may be configured as a classification model based on machine learning, such as support vector machine (SVM), logistic regression, or the like.

The structure of each of the plurality of classifiers 220 is not necessarily limited to the above-described examples and may be implemented in various forms capable of being trained through training parameter update and usable for binary classification and multiclass classification.

Also, the number of the plurality of classifiers 220 is not necessarily limited to a specific number, and may vary according to embodiments.

According to one embodiment, the first trainer 110 may train the deep neural network model 200 by performing first global update to update a training parameter of the deep neural network model using the first data set and first local update to update a training parameter of each of the plurality of classifiers using the second data set.

In this case, according to one embodiment, the first trainer 110 may train the deep neural network model 200 by repeating the first global update and the first local update alternately. That is, the first trainer 110 may repeatedly perform operations of updating training parameters of the feature extractor 210 and the plurality of classifiers 220 by using the labeled data included in the first data set and then updating the training parameters of the plurality of classifiers 220 by using the unlabeled data included in the second data set.

The training parameter may mean a parameter, for example, a weight, bias, or the like of an activation function, which can be updated through training among parameters of the deep neural network model 200.

According to one embodiment, when the labeled data included in the first data set is input to the deep neural network model 200, the first trainer 110 may perform the first global update to update the training parameters of the feature extractor 210 and the plurality of classifiers 220 such that an estimated label value generated by each of the plurality of classifiers 220 matches a ground-truth label value applied to the input data.

Specifically, according to one embodiment, the first trainer 110 may perform the first global update using a first loss function based on a ground-truth label value assigned to the data input to the deep neural network model 200 from among the data included in the first data set and an estimated label value of each of the plurality of classifiers 220 for the corresponding input data.

In this case, the first loss function may satisfy, for example, Equation 1 below, and the first trainer 110 may update the training parameters of the feature extractor 210 and the plurality of classifiers 220 such that the first loss function is minimized, thereby training the deep neural network model 220 such that the estimated label value output from each of the plurality of classifiers 220 is close to the ground-truth label value allocated to the data input to the deep neural network model 200.

$$L_1 = \sum_{i=1}^{N_b} \sum_{k=1}^{N_h} -y_i \log y'_{k,i} \qquad [\text{Equation 1}]$$

Here, $L_1$ denotes the first loss function, $N_b$ denotes the number of data input to the deep neural network model 200 for the first global update, $N_h$ denotes the number of classifiers 220, $y_i$ denotes a ground-truth label value assigned to the i-th data among the data input to the deep neural network model 200 for the first global update, and $y'_{k,i}$ denotes an estimated label value for the i-th data of the k-th classifier among the plurality of classifiers 220.

According to one embodiment, when the unlabeled data included in the second data set is input to the deep neural network model 200, the first trainer 110 may perform the first local update to update the training parameters of the plurality of classifiers 220 such that each of the plurality of classifiers 220 generates a different estimated label value.

Specifically, according to one embodiment, the first trainer 110 may perform the first local update using a second loss function based on an estimated label value of each of the plurality of classifiers 220 for the data input to the deep neural network model 200 from among the data included in the second data set and an ensemble-estimated label value for the corresponding input data.

In this case, the second loss function may satisfy, for example, Equation 2 below, and the first trainer 110 may update the training parameters of the plurality of classifiers 220 such that the second loss function is minimized, thereby training the deep neural network model 200 so that each of the plurality of classifiers 220 outputs a different estimated label value for the data input to the deep neural network model 220.

$$L_2 = \sum_{i=1}^{N_b} \sum_{k=1}^{N_h} y''_i \log y'_{k,i} \qquad \text{[Equation 2]}$$

Here, $L_2$ denotes the second loss function, $N_b$ denotes the number of data input to the deep neural network model 200 for the first local update, $N_h$ denotes the number of classifiers 220, $y''_i$ denote an ensemble-estimated label value for the i-th data among the data input to the deep neural network model 200 for the first local update, and $y'_{k,i}$ denotes an estimated label value for the i-th data of the k-th classifier among the plurality of classifiers 200.

The ensemble-estimated label value may be an average value of the estimated label values output from the plurality of classifiers 220 for the data input to the deep neural network model 200, as shown in, for example, Equation 3 below, and may be calculated in various ways, other than an average value, according to embodiments.

$$y''_i = \frac{1}{N_h} \sum_{k=1}^{N_h} y'_{k,i} \qquad \text{[Equation 3]}$$

The label assigner 120 may assign a ground-truth label value to some of the data included in the second data set and update the first data set and the second data set such that the data to which the ground-truth label value is assigned is added to the first data set.

According to one embodiment, the label assigner 120 may determine some of the data included in the second data set to be target data to be labeled based on an estimated label value of each of the plurality of classifiers 220 for each data included in the second data set.

For example, the label assigner 120 may calculate a score for each data included in the second data set based on the estimated label value of each of the plurality of classifiers 220 and determine, as the target data to be labeled, a predetermined number of data or a predetermined proportion of data, among the data included in the second data set, based on descending order of the scores calculated.

In this case, for example, the more the estimated label values of the plurality of classifiers 220 differ, the higher the score of each data included in the second data set may be determined to be.

When the target data to be labeled is determined, the label assigner 120 may receive a ground-truth label value to be assigned to each of the target data to be labeled from a user, and assign the input ground-truth label value to each of the target data to be labeled. For example, the label assigner 120 may provide the target data to be labeled to the user through a screen, and receive the ground-truth label value to be assigned to each of the target data to be labeled from the user through a user interface screen for receiving the ground-truth label value for the provided target data to be labeled.

After the label value is assigned for the target data to be labeled, the label assigner 120 may update the first data set and the second data set by excluding, from the second data set, the target data to which the label value has been assigned and simultaneously adding the same to the first data set.

The second trainer 130 uses the updated first data set and the updated second data set to further train the deep neural network model 200 which has been trained by the first trainer 110.

According to one embodiment, the second trainer 130 may further train the deep neural network model 200 by performing second global update to update the training parameter of the deep neural network model 200 using the updated first data set and second local update to update the training parameter of the feature extractor 210 using the updated second data set.

In this case, according to one embodiment, the second trainer 130 may repeat the second global update and the second local update alternately. That is, the second trainer 130 may repeatedly perform operations of updating the training parameters of the feature extractor 210 and the plurality of classifiers 220 by using the labeled data included in the updated first data set, and then updating the training parameter of the feature extractor 210 by using the unlabeled data included in the updated second data set.

Specifically, according to one embodiment, when the labeled data included in the first data set is input to the deep neural network model 200, the second trainer 130 may perform the second global update to update the training parameters of the feature extractor 210 and the plurality of classifiers 220 such that an estimated label value generated by each of the plurality of classifiers 220 matches a ground-truth label value assigned to the input data.

In this case, according to one embodiment, the second trainer 130 may update the training parameters of the feature extractor 210 and the plurality of classifiers 220 such that the above-described first loss function is minimized, thereby training the deep neural network model such that the estimated label value output from each of the plurality of classifiers 220 is close to the ground-truth label value assigned to the data input to the deep neural network model 200.

According to one embodiment, when the unlabeled data included in the updated second data set is input to the deep neural network model 200, the second trainer 130 may perform the second local update to update the training parameter of the feature extractor 210 such that each of the plurality of classifiers 220 generates the same estimated label value.

Specifically, according to one embodiment, the second trainer 130 may perform the second local update using a third loss function based on the estimated label value of each of the plurality of classifiers 220 for the data input to the deep neural network model 200 among the data included in the updated second data set and an ensemble-estimated label value for the corresponding input data.

In this case, the third loss function may satisfy, for example, Equation 4 below, and update the training parameter of the feature extractor 210 such that the third loss function is minimized, thereby train the deep neural network model 200 such that each of the plurality of classifiers 220 outputs the same estimated label value for the data input to the deep neural network model 200.

$$L_3 = \sum_{i=1}^{N_b} \sum_{k=1}^{N_h} -y_i'' \log y'_{k,i} \qquad [\text{Equation 4}]$$

Here, $L_3$ denotes the third loss function, $N_b$ denotes the number of data input to the deep neural network model 200 for the second local update, $N_h$ denotes the number of classifiers 220, $y''_i$ denotes an ensemble-estimated label value for the i-th data among the data input to the deep neural network model 200 for the second local update, and $y'_{k,i}$ denotes an estimated label value for the i-th data of the k-th classifier among the plurality of classifiers 220.

Figure 3:
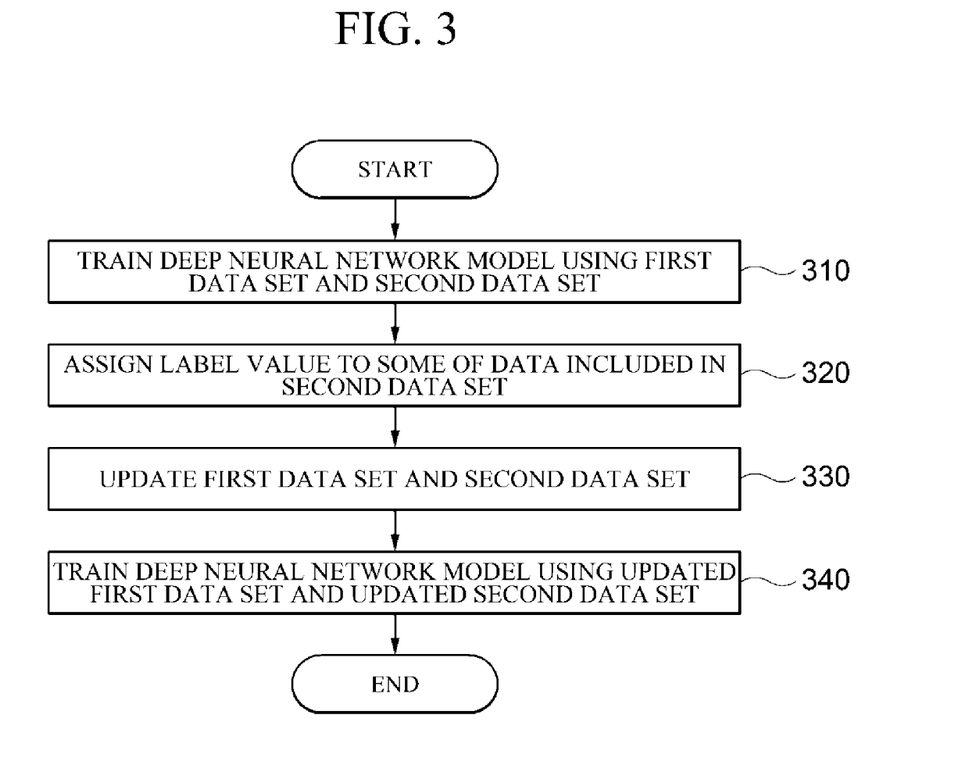
FIG. 3 is a flowchart illustrating a training method according to one embodiment.

FIG. 3 is a flowchart illustrating a training method according to one embodiment. The method shown in FIG. 3 may be performed by the training apparatus 100 shown in FIG. 1.

Referring to FIG. 3, the training apparatus 100 trains the deep neural network model 200 using a first data set including a plurality of labeled data and a second data set including a plurality of unlabeled data (310).

Then, the training apparatus 100 assigns a ground-truth label value to some of the data included in the second data set (320).

In this case, according to one embodiment, the training apparatus 100 may determine some of the data included in the second data set to be target data to be labeled based on an estimated label value of each of the plurality of classifiers 220 for each data included in the second data set.

For example, the training apparatus 100 may calculate a score of each data included in the second data set such that the more the estimated label values of the plurality of classifiers 220 differ, the higher the score of each data included in the second data set is. Then, the training apparatus 100 may determine, as the target data to be labeled, the predetermined number of data or a predetermined proportion of data, among the data included in the second data set, based on descending order of the scores calculated.

In addition, according to one embodiment, the training apparatus 100 may receive a ground-truth label value to be assigned to each of the target data to be labeled from a user, and assign the input ground-truth label value to each of the target data to be labeled.

Then, the training apparatus 100 updates the first data set and the second data set such that the target data to be labeled to which the ground-truth label value is assigned in operation 320 is included in the first data set (330).

Specifically, the training apparatus 100 may update the first data set and the second data set by excluding, from the second data set, the target data to which the label value has been assigned and simultaneously adding the same to the first data set.

Thereafter, the training apparatus 100 further trains the deep neural network model 200 using the updated first data set and the updated second data set (340).

In the flowchart illustrated in FIG. 3, at least some of the operations may be performed in different order or may be combined into fewer operations or further divided into more operations. In addition, some of the operations may be omitted, or one or more extra operations, which are not illustrated, may be added to the flowchart and be performed.

Figure 4:
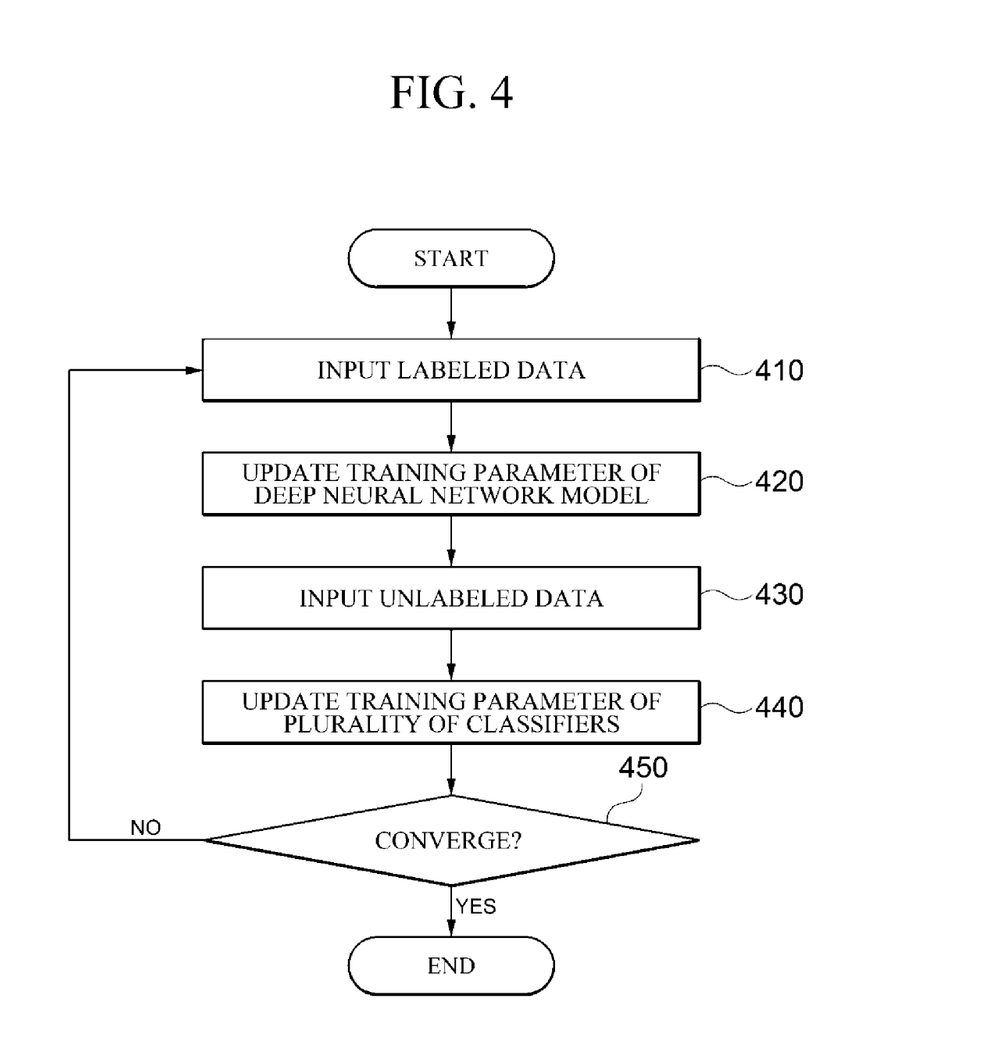
FIG. 4 is a flowchart illustrating a process of training a deep neural network model according to one embodiment.

FIG. 4 is a flowchart illustrating a process of training a deep neural network model according to one embodiment.

Specifically, the training process shown in FIG. 4 may be performed in operation 310 shown in FIG. 3.

Referring to FIG. 4, the training apparatus 100 inputs the labeled data, which is included in the first data set, to the deep neural network model 200 (410).

Then, the training apparatus 100 updates a training parameter of the deep neural network model 200 by performing first global update (420).

In this case, according to one embodiment, the training apparatus 100 may update training parameters of the feature extractor 210 and the plurality of classifiers 200 included in the deep neural network model 200 such that the above-described first loss function is minimized.

Then, the training apparatus 100 inputs unlabeled data, which is included in the second data set, to the deep neural network model 200 (430).

Then, the training apparatus 100 updates the training parameters of the plurality of classifiers 220 included in the deep neural network model 200 by performing the first local update (440).

At this time, according to one embodiment, the training apparatus 100 may update the training parameters of the plurality of classifiers 220 included in the deep neural network model 200 such that the above-described second loss function is minimized.

Thereafter, the training apparatus 100 determines whether a loss value calculated by each of the first loss function and the second loss function in the processes of the first global update and the first local update converges (450). When the loss values do not converge, the training apparatus 100 repeats operations 410 through 440 until they converge.

In the flowchart illustrated in FIG. 4, at least some of the operations may be performed in different order or may be combined into fewer operations or further divided into more operations. In addition, some of the operations may be omitted, or one or more extra operations, which are not illustrated, may be added to the flowchart and be performed.

Figure 5:
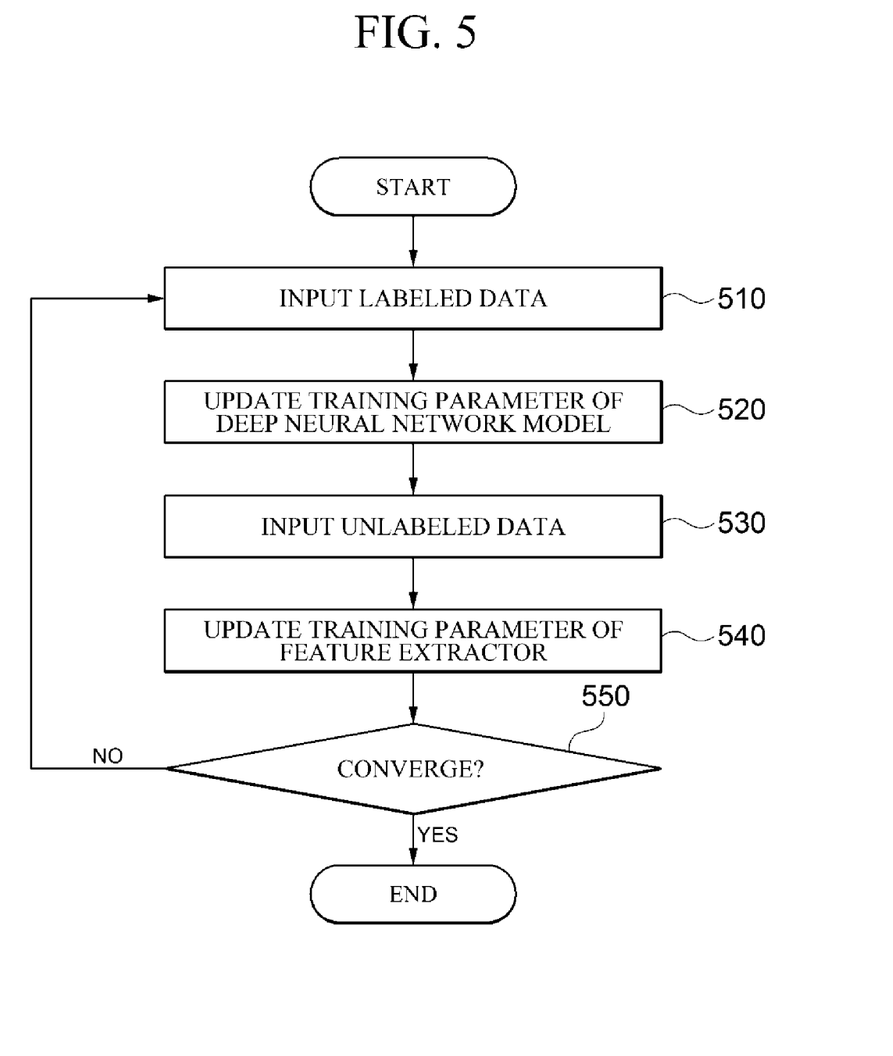
FIG. 5 is a flowchart illustrating a process of further training a deep neural network model according to one embodiment.

FIG. 5 is a flowchart illustrating a process of further training a deep neural network model according to one embodiment.

Specifically, the training process shown in FIG. 5 may be performed in operation 340 shown in FIG. 3.

Referring to FIG. 5, the training apparatus 100 inputs the labeled data, which is included in the updated first data set, to the deep neural network model 200 (510).

Then, the training apparatus 100 updates the training parameter of the deep neural network model 200 by performing the second global update (520).

In this case, according to one embodiment, the training apparatus 100 may update the training parameters of the feature extractor 210 and the plurality of classifiers 200, which are included in the deep neural network model 200, such that the above-described first loss function is minimized.

Then, the training apparatus 100 inputs the unlabeled data, which is included in the updated second data set, to the deep neural network model 200 (530).

Thereafter, the training apparatus 100 updates the training parameter of the feature extractor 210 included in the deep neural network model 200 by performing the second local update (440).

In this case, according to one embodiment, the training apparatus 100 may update the training parameter of the feature extractor 210 included in the deep neural network model 200 such that the above-described third loss function is minimized.

Then, the training apparatus 100 determines whether a loss value calculated by each of the first loss function and the third loss function in the processes of the second global update and the second local update converges (550). When the loss values do not converge, the training apparatus 100 repeats operations 510 through 540 until they converge.

In the flowchart illustrated in FIG. 5, at least some of the operations may be performed in different order or may be combined into fewer operations or further divided into more operations. In addition, some of the operations may be omitted, or one or more extra operations, which are not illustrated, may be added to the flowchart and be performed.

Figure 6:
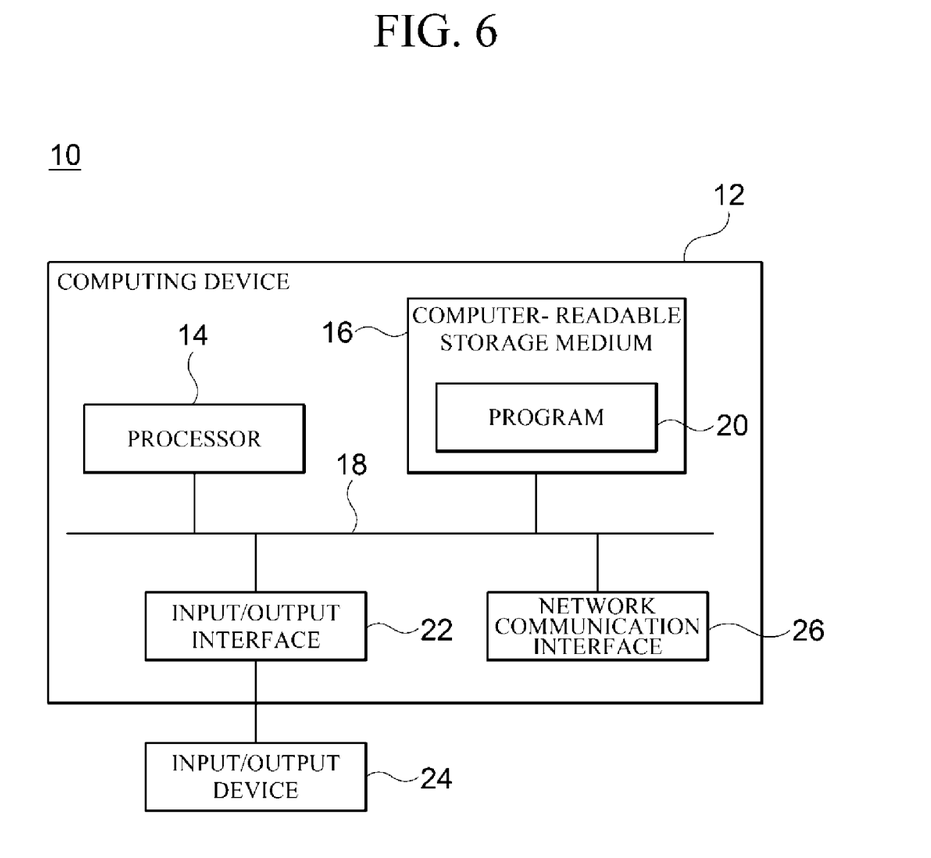
FIG. 6 is a block diagram illustrating a computing environment including a computing device suitable to be used in exemplary embodiments.

FIG. 6 is a block diagram illustrating a computing environment including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be one or more components included in the training apparatus 100 according to the embodiments of the present disclosure. The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to an exemplary embodiment.

The computer-readable storage medium 16 is configured to store computer executable commands and program codes, program data and/or information in other suitable forms. The program 20 stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method which is performed by a computing device comprising one or more processors and a memory storing one or more programs to be executed by the one or more processors, the method comprising:
training a deep neural network model using a first data set including a plurality of labeled data and a second data set including a plurality of unlabeled data;
assigning a ground-truth label value to some of the plurality of unlabeled data;
updating the first data set and the second data set such that the data to which the ground-truth label value is assigned is included in the first data set; and
further training the deep neural network model using the updated first data set and the updated second data set,
wherein the deep neural network model comprises a feature extractor configured to generate a feature vector for input data of the deep neural network model and a plurality of classifiers configured to each generate an estimated label value for the input data based on the feature vector, and
wherein the training comprises training the deep neural network by performing a first global update to update training parameters of the feature extractor and the plurality of classifiers using the first data set and a first local update to update training parameters of each of the plurality of classifiers using the second data set.

2. The method of claim 1, wherein the training comprises repeating the first global update and the first local update alternately.

3. The method of claim 1, wherein the training comprises:
performing the first global update such that a ground-truth label value assigned to each data included in the first data set matches the estimated label value of each of the plurality of classifiers for each data included in the first data set; and
performing the first local update such that each of the plurality of classifiers generates a different estimated label value for each data included in the second data set.

4. The method of claim 1, wherein the training comprises:
performing the first global update using a first loss function based on the ground-truth label value assigned to each data included in the first data set and the estimated label value of each of the plurality of classifiers for each data included in the first data set; and
performing the first local update using a second loss function based on the estimated label value of each of the plurality of classifiers for each data included in the second data set and an ensemble-estimated label value based on the estimated label value of each of the plurality of classifiers for each data included in the second data set.

5. The method of claim 1, wherein the assigning comprises:
determining some of the data included in the first data set to be target data to be labeled based on an estimated label value of each of the plurality of classifiers for each data included in the first data set;
receiving the ground-truth label value to be assigned to each target data to be labeled from a user; and
assigning the received ground-truth label value to each target data to be labeled.

6. The method of claim 5, wherein the determining comprises:
calculating a score for each data included in the first data set such that the more the estimated label values of the plurality of classifiers differ, the higher the score of each data included in the first data set is; and
determining, as the target data to be labeled, a predetermined number of data or a predetermined proportion of data, among the data included in the first data set, based on descending order of the scores calculated.

7. The method of claim 1, wherein the further training comprises further training the deep neural network model by performing second global update to update training parameters of the deep neural network model using the updated first data set and second local update to update training parameters of the feature extractor using the updated second data set.

8. The method of claim 7, wherein the further training comprises repeating the second global update and the second local update alternately.

9. The method of claim 7, wherein the further training comprises:
performing the second global update such that a ground-truth label value assigned to each data included in the updated first data set matches an estimated label value of each of the plurality of classifiers for each data included in the updated first data set; and
performing the second local update such that each of the plurality of classifiers generates the same estimated label value for each data included in the updated first data set.

10. The method of claim 7, wherein the further training comprises:
performing the second global update using a first loss function based on a ground-truth label value assigned to each data included in the updated first data set and an estimated label value of each of the plurality of classifiers for each data included in the updated first data set; and
performing the second local update using a third loss function based on an estimated label value of each of the plurality of classifiers for each data included in the updated second data set and an ensemble-estimated label value based on the estimated label value of each of the plurality of classifiers for each data included in the updated second data set.

11. An apparatus comprising:
one or more processors; and
a memory storing one or more programs to be executed by the one or more processors,
wherein the programs include commands to perform operations comprising:
training a deep neural network model using a first data set including a plurality of labeled data and a second data set including a plurality of unlabeled data,
assigning a ground-truth label value to some of the plurality of unlabeled data,
updating the first data set and the second data set such that the data to which the ground-truth label value is assigned is included in the first data set, and
further training the deep neural network model using the updated first data set and the updated second data set,
wherein the deep neural network model comprises a feature extractor configured to generate a feature vector for input data of the deep neural network model and a plurality of classifiers configured to each generate an estimated label value for the input data based on the feature vector, and
wherein the training comprises training the deep neural network by performing a first global update to update training parameters of the feature extractor and the plurality of classifiers using the first data set and a first local update to update training parameters of each of the plurality of classifiers using the second data set.

12. The apparatus of claim 11, wherein the training comprises repeating the first global update and the first local update alternately.

13. The apparatus of claim 11, wherein the training comprises:
performing the first global update such that a ground-truth label value assigned to each data included in the first data set matches the estimated label value of each of the plurality of classifiers for each data included in the first data set; and
performing the first local update such that each of the plurality of classifiers generates a different estimated label value for each data included in the second data set.

14. The apparatus of claim 11, wherein the training comprises:
performing the first global update using a first loss function based on the ground-truth label value assigned to each data included in the first data set and the estimated label value of each of the plurality of classifiers for each data included in the first data set; and
performing the first local update using a second loss function based on the estimated label value of each of the plurality of classifiers for each data included in the second data set and an ensemble-estimated label value based on the estimated label value of each of the plurality of classifiers for each data included in the second data set.

15. The apparatus of claim 11, wherein the assigning comprises:
determining some of the data included in the first data set to be target data to be labeled based on an estimated label value of each of the plurality of classifiers for each data included in the first data set;
receiving the ground-truth label value to be assigned to each target data to be labeled from a user; and
assigning the received ground-truth label value to each target data to be labeled.

16. The apparatus of claim 15, wherein the determining comprises:
calculating a score for each data included in the first data set such that the more the estimated label values of the plurality of classifiers differ, the higher the score of each data included in the first data set is; and
determining, as the target data to be labeled, a predetermined number of data or a predetermined proportion of data, among the data included in the first data set, based on descending order of the scores calculated.

17. The apparatus of claim 11, wherein the further training comprises further training the deep neural network model by performing second global update to update training parameters of the deep neural network model using the updated first data set and second local update to update training parameters of the feature extractor using the updated second data set.

18. The apparatus of claim 17, wherein the further training comprises repeating the second global update and the second local update alternately.

19. The apparatus of claim 17, wherein the further training comprises:
- performing the second global update such that a ground-truth label value assigned to each data included in the updated first data set matches an estimated label value of each of the plurality of classifiers for each data included in the updated first data set; and
- performing the second local update such that each of the plurality of classifiers generates the same estimated label value for each data included in the updated first data set.

20. The apparatus of claim 17, wherein the further training comprises:
- performing the second global update using a first loss function based on a ground-truth label value assigned to each data included in the updated first data set and an estimated label value of each of the plurality of classifiers for each data included in the updated first data set and
- performing the second local update using a third loss function based on an estimated label value of each of the plurality of classifiers for each data included in the updated second data set and an ensemble-estimated label value based on the estimated label value of each of the plurality of classifiers for each data included in the updated second data set.

* * * * *